(12) United States Patent
Glynn et al.

(10) Patent No.: US 7,772,517 B2
(45) Date of Patent: Aug. 10, 2010

(54) METHOD OF MAKING A PLURALITY OF TOOL INSERTS

(76) Inventors: John David Glynn, Knockaderra, Ballycoree Road, Ennis, Ennis, County Clare (IE); Stephen James Linnane, 10 Tullyvarraga Hill, Shannon, County Clare (IE)

( * ) Notice: Subject to any disclaimer, the term of this patent is extended or adjusted under 35 U.S.C. 154(b) by 630 days.

(21) Appl. No.: 10/585,341

(22) PCT Filed: Jan. 5, 2005

(86) PCT No.: PCT/IB2005/000004
§ 371 (c)(1),
(2), (4) Date: Sep. 18, 2007

(87) PCT Pub. No.: WO2005/068129
PCT Pub. Date: Jul. 28, 2005

(65) Prior Publication Data
US 2009/0223936 A1   Sep. 10, 2009

(30) Foreign Application Priority Data
Jan. 6, 2004   (IE) ............................. S2004/0003

(51) Int. Cl.
*B23H 9/14* (2006.01)
(52) U.S. Cl. .................................................. 219/69.17
(58) Field of Classification Search .............. 219/69.11, 219/69.17, 69.15; 175/420.1, 420.2; 408/144, 408/145
See application file for complete search history.

(56) References Cited

U.S. PATENT DOCUMENTS

| 1,734,554 | A |   | 11/1929 | Behrman |        |
|-----------|---|---|---------|---------|--------|
| 4,572,722 | A | * | 2/1986  | Dyer    | 51/309 |
| 4,849,602 | A |   | 7/1989  | Gardner |        |
| 5,676,496 | A |   | 10/1997 | Littecke et al. | |
| 6,120,570 | A |   | 9/2000  | Packer et al. | |
| 6,663,326 | B1|   | 12/2003 | Hiroyasu et al. | |
| 6,846,341 | B2| * | 1/2005  | Middlemiss | 51/309 |

FOREIGN PATENT DOCUMENTS

| DE | 33 00 105     |   | 7/1984  |
|----|---------------|---|---------|
| EP | 0 019 461     |   | 11/1980 |
| EP | 1023961 A1    | * | 8/2000  |
| JP | 58-016003     |   | 1/1983  |
| JP | 62-84929 A    | * | 4/1987  |
| JP | 03-287396     |   | 12/1991 |
| JP | 3-287396 A    | * | 12/1991 |
| JP | 10-249644 A   | * | 9/1998  |
| WO | 03/070416     |   | 8/2003  |

* cited by examiner

*Primary Examiner*—Geoffrey S Evans
(74) *Attorney, Agent, or Firm*—Oblon, Spivak, McClelland, Maier & Neustadt, L.L.P.

(57) ABSTRACT

A method of producing a plurality of tool inserts (20) from a body of polycrystalline ultra-hard material (10), in particular polycrystalline diamond and polycrystalline cubic boron nitride, having major surfaces (12, 14) on each of opposite sides thereof. The method includes the step of simultaneously producing a plurality of spaced holes (16, 26) in the body, each hole generally extending from one major surface to the opposite major surface. The holes are produced by a plurality of electrodes which may be arranged in a desired pattern. The body is severed between the holes to produce the plurality of tool inserts.

10 Claims, 2 Drawing Sheets

METHOD OF MAKING A PLURALITY OF TOOL INSERTS

BACKGROUND OF THE INVENTION

This invention relates to tool inserts.

Polycrystalline diamond (PCD) and polycrystalline cubic boron nitride (PCBN) are hard materials used extensively for producing a variety of cutting and abrading tool inserts. PCD is frequently used in a form in which it is intimately bonded to a cemented carbide substrate during the manufacturing process. PCD and PCBN are produced using manufacturing conditions at which diamond and CBN are crystallographically stable.

One method for using cutting tool materials, for example polycrystalline diamond (PCD) or polycrystalline cubic boron nitride (PCBN), is to wire EDM or laser cut ISO-style cutting inserts from a large disc. Smaller cut pieces, for example a 60 degree triangle of 3 mm side length, are generally brazed into a preformed pocket in a tungsten carbide 'blank' or substrate in order to produce a 'braze-tipped' insert. The brazed assembly is then ground to produce a finished cutting tool. Many of the substrates used for insert manufacture have a centrally located hole to facilitate screw clamping of the insert in the tool holder—the optimum manner in which to clamp a cutting insert. Inserts with a clamping or 'pin-locking' hole may also be clamped using a top-clamp or a top-and-hole-clamp and are thus more versatile than solid or full-top inserts. Braze-tipped inserts with a clamping hole are no more expensive to manufacture than braze-tipped inserts without a clamping hole, due to near-net shape sintering of the holed and pocketed carbide blanks. In the case of larger 'full-top' pieces, these are cut to a near net ISO shape dimension, typically a 60-degree triangle with an 11 mm side length. Here, no brazing is required as the blank effectively is the complete finished tool assembly. In most cases this style of tool can only be readily clamped by top clamp arrangement only.

The brazing of small tips in many cases is an expensive and complex process, invariably being manual in nature. From an application point of view, brazing adds no value to a finished tool: In certain applications, the presence of a braze joint can limit the performance of the tool in that excessively large depths of cut and/or feed and excessively high cutting speed, result in melting of the braze joint and catastrophic tool failure (despite the mechanical loads being well below the inherent strength of the cutting tool material). Full-top inserts do not contain a braze joint—the layer of the cutting tool material is intimately bonded to a carbide substrate in the sintering process—thus facilitating maximum utilisation of the cutting tool materials' mechanical properties. In addition, the use of a larger full top piece provides multiple corners that can be used in the tool, for example triangle with 3 cutting corners and square with 4 cutting corners. Therefore in many cases, if there is no restriction on the flexibility of clamping and costs of material remain similar, then a full top insert is preferable to a brazed small tip insert.

In many machining applications where insert-style tooling is used, screw clamping or hole clamping is preferred as it gives better location and rigidity—both known to affect tool performance significantly. In addition, there is a definite and growing trend to machine at higher cutting speeds, which puts a greater requirement on location and rigidity for safety and performance reasons. This is particularly true for rotating tools, such as are applied in milling cutters.

Furthermore, top clamping on the surface of a hard brittle material like PCBN presents an unfavourable loading condition and can lead to or exacerbate insert breakage. Hole clamping and screw clamping apply contact stresses in a more favourable mode compared to top clamping of brittle PCBN material surface. Also, an increasing trend to polish the surface of PCBN inserts makes friction or grip with a top clamping arrangement less secure.

The holing of individual inserts involves complex positioning and machining with laser, EDM and mechanical grinding. This complexity adds to the cost of producing inserts with pin-locking holes.

SUMMARY OF THE INVENTION

According to the present invention, a method of making a plurality of tool inserts from a body of polycrystalline ultra-hard material which has major surfaces on each of opposite sides thereof, includes the steps of producing a plurality of spaced holes in the body, each hole generally extending from one major surface to the opposite major surface, and then severing the body between the holes to produce a plurality of tool inserts.

The holes are preferably produced simultaneously and may be produced using an electrode which penetrates the surface exposed to it. Preferably, a plurality of electrodes in the desired pattern is used so that the holes can be produced simultaneously. The plurality of electrodes will be mounted in a holding device in known manner.

The holes may be profiled at one or both of the major surfaces. The profile may take the form of a chamfer or recess suitable to receive the head of a screw.

The polycrystalline ultra-hard material will generally be polycrystalline diamond (PCD) or polycrystalline CBN (PCBN) and may be bonded to a substrate such as a cemented carbide substrate. When a substrate is present, the holes will generally extend through both the polycrystalline ultra-hard material and the substrate. Severing between the holes to produce the inserts will also extend through both the polycrystalline ultra-hard material and the substrate.

Typically, the severing of the body of polycrystalline material will be achieved using EDM or laser cutting.

The body will generally take the shape of a disc. The invention has particular application to large diameter discs, e.g. those having a diameter of 50 mm or more.

According to another aspect of the invention, a unit comprises a body of polycrystalline ultra-hard material having major surfaces of opposite sides thereof and a plurality of holes formed in one major surface and generally extending through the body to the opposite major surface. The body is further provided with sever lines formed in a major surface between the holes and which do not extend to the opposite major surface, the sever lines being capable of being ruptured, e.g. in a snapping action, to produce a plurality of tool inserts.

DESCRIPTION OF EMBODIMENTS

Figure 1:
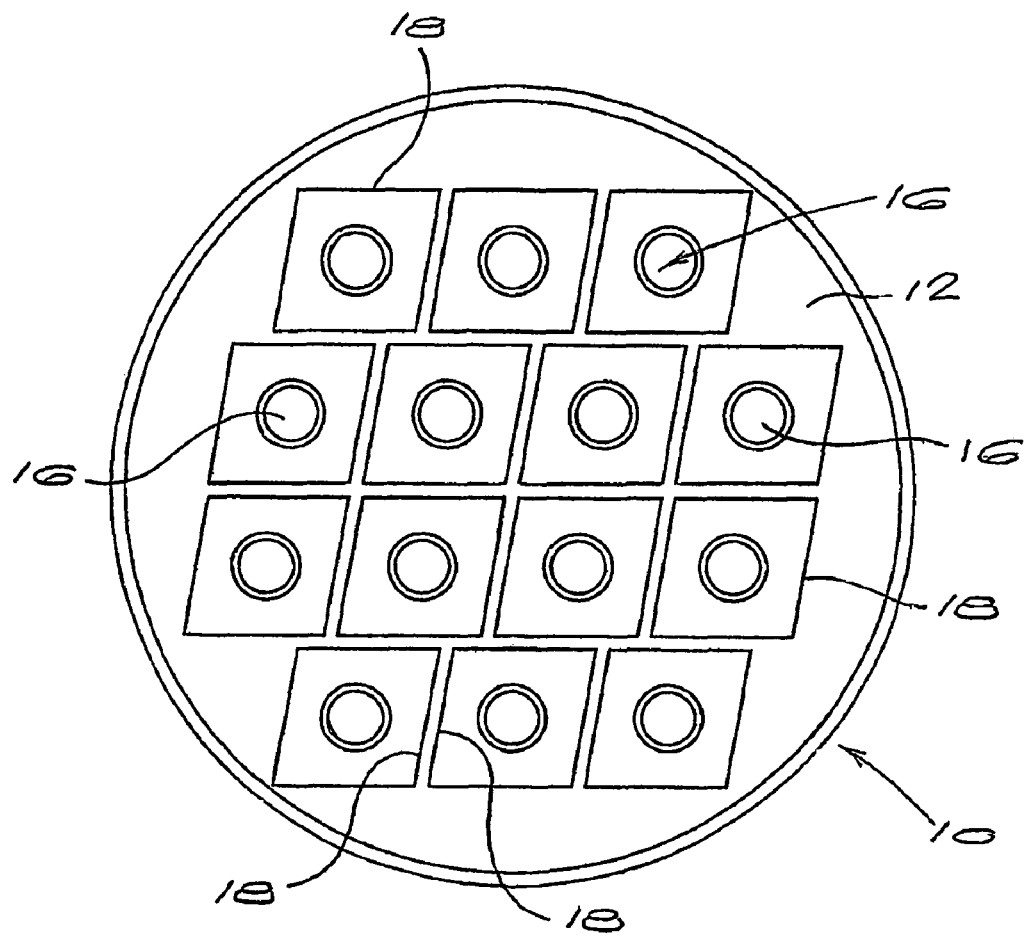
FIG. 1 is a plan view of a disc of polycrystalline ultra-hard material illustrating an embodiment of the method of the invention.
Figure 2:
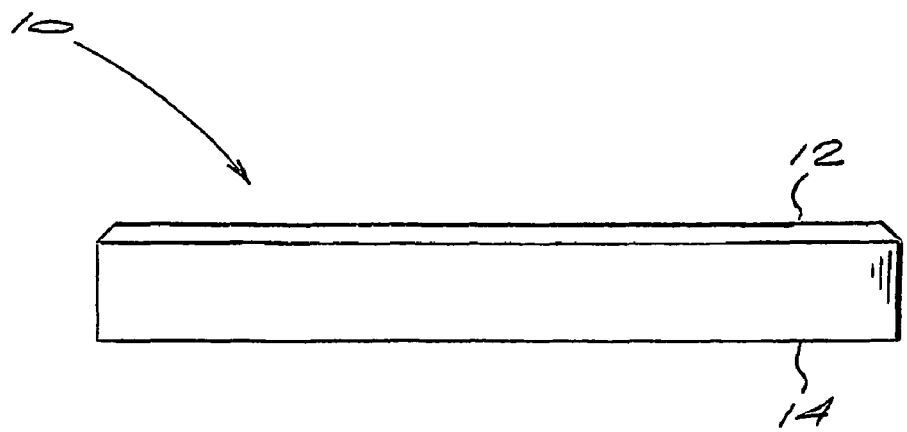
FIG. 2 is a side view of FIG. 1.

Embodiments of the invention will now be described with reference to the accompanying drawings. Referring first to FIGS. 1 and 2, a disc 10 of polycrystalline ultra-hard material has a major surface 12 and an opposite major surface 14. A plurality of holes 16 is produced in the disc 10. The holes extend from the major surface 12 to the opposite major surface 14. The holes are typically created using a plurality of electrodes mounted in a holder in a desired pattern so the holes are all produced simultaneously. This manner of producing the holes is known as die-sinking EDM.

A plurality of tool inserts is then produced by severing the disc 10, e.g. using EDM cutting or laser cutting, along the lines 18. This results in fourteen tool inserts, each with a rhombic shape, being produced. Each insert has a centrally located hole 16 extending through it. Each insert is thus capable of being clamped to a tool holder using a screw or pin lock clamping means.

Figure 3:
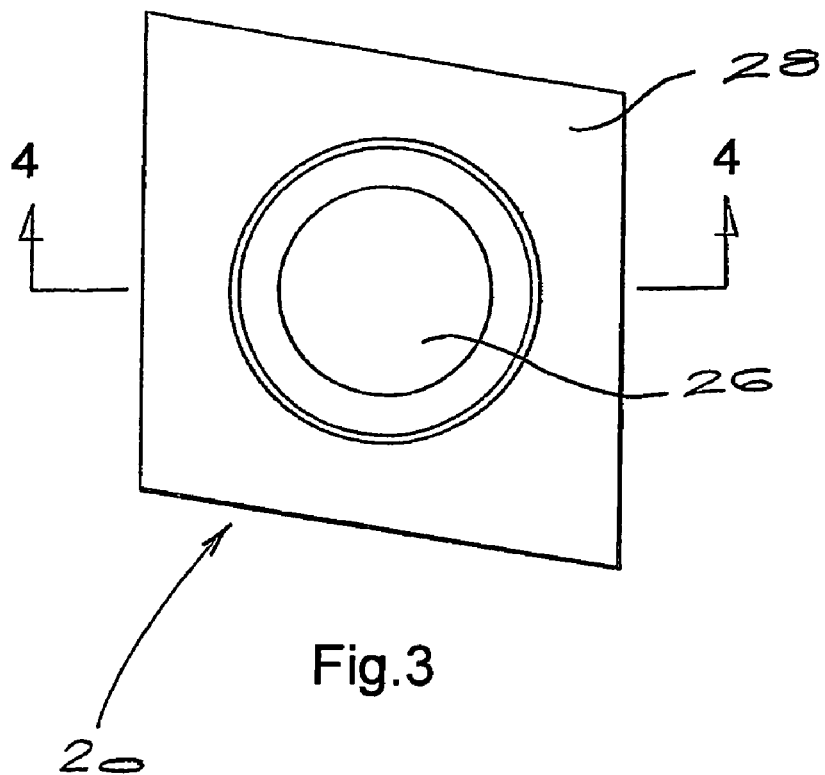
FIG. 3 is a plan view of an embodiment of a tool insert produced by the method of the invention.
Figure 4:
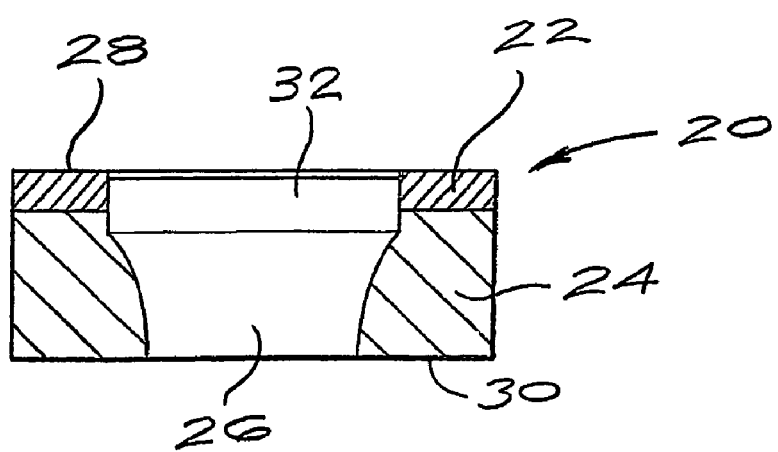
FIG. 4 is a section along the line 4-4 of FIG. 3.

A embodiment of a tool insert made by the method of the invention is illustrated by FIGS. 3 and 4. Referring to these Figures, a tool insert 20 comprises a layer 22 of polycrystalline ultra-hard material bonded to a substrate, typically a cemented carbide substrate, 24. A hole 26 extends from the top surface 28 of the layer 22 to the bottom surface 30 of the substrate 24.

The hole 26 has a wider diameter at the top surface 28 resulting in a recess or chamfer 32 which can accommodate the head of a screw.

In an example of the invention, a plurality of cutting inserts as illustrated by FIGS. 3 and 4 were produced from a disc comprising a layer of polycrystalline CBN bonded to a cemented carbide substrate. The disc was held in a clamp around its periphery and a plurality of electrodes in a cross-hatch arrangement used to cut simultaneously, by die-sink EDM, 116 holes through both the layer of polycrystalline CBN and the carbide substrate. Machining time was three minutes per hole. Thereafter, the disc was severed along sever lines between the 116 holes to produce 116 cutting inserts, each of the type illustrated by FIGS. 3 and 4. Severing was achieved using a known EDM wire cutting technique.

The method of the invention has a number of advantages in producing tool inserts capable of being used in a screw or pin lock arrangement:

1. Improved accuracy in the location of the locking hole relative to the cutting point, both in manufacture and application of the insert. As cutting tool materials can be used for precision machining, accuracy is extremely important in obtaining optimum performance.
2. Increase speed and precision in this operation due to single fixturing and multi-point electrodes. Undertaking this operation on individual pieces involves single setting of each piece. This is uneconomic and results in dimensional inaccuracies across a large number of pieces.
3. Reduced costs due to combining of segmenting and hole production. The fact that segmenting and pin-locking a large disc will create a significant number of finished inserts means that considerable economic benefit can be gained from combining these two processes in one automated machine on one disk with one set-up.
4. Integration of measurement, pin-locking (hole making) and segmentation processes. Furthermore this concept of the process being based on production with single large disc on one set-up can be further extended to incorporate up-stream and down-stream processes; to include imaging of the disk and measurement of the pin-locked and segmented insert in situ i.e. the disc is clamped once and then measured, pin locked, measured, segmented, measured and released—it remains in one situation.
5. Reduction of inventory and processes involved in the production of brazed inserts through the use of full-top inserts.
6. Easier grindability of the full-top or solid inserts due to the fact that brazed inserts tend to have an 'oversize' in the blank to facilitate the positioning the cutting tool blank in the pocket. This geometric difference between the brazed blank and the substrate makes the initial stages of the grinding process more sensitive.
7. The use of a pin-lock enables easier use of inserts in ISO thickness 01, T1 or 02. These thinner tool format are often preferred in boring applications where tool with a small overall geometry are required. These thin formats are very difficult to produce with a brazed insert.

The invention claimed is:

1. A method of making a plurality of tool inserts from a body including a layer of polycrystalline ultra-hard material, the body having major surfaces on each of opposite sides thereof, the method comprising:
    producing a plurality of spaced holes simultaneously in the body by electric discharge machining using a plurality of electrodes arranged in a desired pattern, the holes configured to accommodate a screw or pin-locking arrangement; and
    severing the body between the holes to produce the plurality of tool inserts;
    wherein the holes extend at least partially into the layer of polycrystalline ultra-hard material.

2. The method according to claim 1, wherein the holes extend through the layer of ultra-hard material from one major surface of the body to the opposite major surface of the body.

3. The method according to claim 1, wherein the layer of ultra-hard material is one of polycrystalline diamond and polycrystalline CBN.

4. The method according to claim 3, wherein the layer of ultra-hard material is bonded to a substrate layer.

5. The method according to claim 4, wherein the substrate layer is made of cemented carbide.

6. The method according to claim 4, wherein the holes extend through both the ultra-hard material layer and the substrate layer.

7. The method according to claim 1, wherein severing the body to produce the plurality of tool inserts is achieved by EDM or laser cutting.

8. The method according to claim 1, wherein the body has a disc-shape.

9. The method according to claim 8, wherein the body is at least 50 mm in diameter.

10. The method according to claim 1, wherein severing the body is performed by a snapping action along sever lines on the body, thereby rupturing the body into the plurality of tool inserts.

* * * * *